INVENTOR
J. D. FOULKES
BY
ATTORNEY 3,233,190
ASTABLE MULTIVIBRATORS WITH PROGRESSIVELY VARYING TIME CONSTANTS
John D. Foulkes, Lexington, Mass., assignor to Bell Telephone Laboratories, Incorporated, New York, N.Y., a corporation of New York
Filed Jan. 3, 1963, Ser. No. 249,270
2 Claims. (Cl. 331—113)

This invention relates to pulse generating circuits, and, more particularly, to circuits for generating sequences of pulses with progressively varying time displacements.

A timing pulse generator is a circuit that produces a fixed sequence of output pulses. These output pulses are typically used to periodically initiate events in some part of a system or to provide a scale of time intervals for time measurement. Generally, this scale of time intervals is a linear measure, i.e., a sequence of timing pulses equally displaced in time from each other. Two particular widely used methods of generating linearly spaced timing pulses are by the use of a free-running multivibrator or a relaxation oscillator. These circuits provide a reliable sequence of linearly spaced timing pulses to initiate linearly spaced periodic events and for timing events of approximately the same magnitude.

Many times, however, it is necessary to initiate events that are not spaced linearly apart or to time the occurrence of events whose time duration varies over a wide range representing several orders of magnitude. An example of a system in which events are not initiated at linearly spaced intervals of time is disclosed by R. Klahn in Patent 3,012,240, issued December 5, 1961, where a magnetic core matrix has its columns pulsed at nonlinear intervals of time. Similarly, an example of events to be timed whose magnitudes vary over a wide range is found in the Morse code, wherein the duration of dots and dashes are related by orders of magnitude to each other. In such a situation, it is desirable to time the orders of magnitude rather than the magnitude itself.

A linearly spaced sequence of timing pulses is particularly unsuited for the timing of orders of magnitude. For example, high frequency timing pulses would be required to identify small magnitudes with any degree of accuracy. This same frequency applied to a relatively large magnitude would require the counting of such a large number of timing pulses as to be thoroughly impractical. A somewhat lower frequency used with the intent of partially satisfying the requirements of timing both small and large magnitudes would still require that small magnitudes be timed with a "less than desired" degree of accuracy while the large magnitude would be timed to an accuracy much greater than that required.

To time orders of magnitude, it is necessary to generate a sequence of timing pulses whose periodic recurrence bears a direct relationship to orders of magnitude rather than absolute size. Such a relationship is expressed by a geometrical progression wherein each term of the sequence is derived by multiplying the preceding term by a constant factor. A sequence of timing pulses whose frequencies of occurrence is decreased by a constant factor in every successive cycle would provide a high enough frequency to time accurately a small magnitude while at the same time facilitating the timing of larger magnitudes with the same degree of accuracy.

One method of achieving such a geometrically progressing timing pulse output is to use a tapped delay line with the taps being electrically separated by geometrically increasing distances. However, such a timing device has several disadvantages, the chief one being that the pulse is attenuated as it travels along the delay line limiting the number of effective pulses that are available.

In accordance with the following, it is an object of the present invention to overcome the aforementioned difficulties.

Another object of this invention is to generate a sequence of timing markers whose time displacements from an initial timing marker are proportional to a geometric series.

Still another object of this invention is to generate a sequence of timing markers of uniform amplitude, but of a varying recurrence rate.

A still further object of this invention is to generate a series of timing markers, whose spacing corresponds to a geometric series, at a single output lead.

Yet another object of this invention is to generate a sequence of timing markers whose spacing corresponds with a geometric series with a simple, reliable circuit.

In accordance with the present invention, two amplifying devices are capacitively cross-connected to each other to form an astable (free-running) multivibrator circuit. A variable impedance device is inserted into the discharge path of one of the cross-connected capacitors. The impedance level of this device is regulated by the amount of stored energy contained in a control capacitor connected such that a portion of its stored energy is dissipated each time one of the amplifying devices is energized and then de-energized.

It can be seen that the impedance level of the variable impedance device determines the discharge rate of one of the coupling capacitors, which in turn determines the period during which the multivibrator remains in one of its unstable states. Since the impedance of the discharge path is periodically increased by the dissipation of energy from the control capacitor, the duration of the one unstable state increases geometrically until the energy stored on the control capacitor is sufficiently dissipated to some predetermined limiting state.

A feature of the present invention is the use of a capacitive voltage divider, whose successive voltage levels are controlled by cyclic changes of state of one of the amplifiers of an astable multivibrator. The voltage divider in turn controls a variable impedance device which determines the length of time that the other amplifier of the multivibrator remains in a certain state.

A particular advantage of the combination is that the ratio of the successive time intervals between successive pulse outputs of the multivibrator are entirely dependent on the ratio of capacitances used in the capacitive voltage divider. Neither the absolute values of these capacitors nor the absolute value of any of the other circuit parameters will affect the ratio significantly.

The object, features and advantages of the invention may be more fully understood by reference to a specific embodiment. Such an embodiment will be described with reference to the accompanying drawings wherein.

Figure 1:
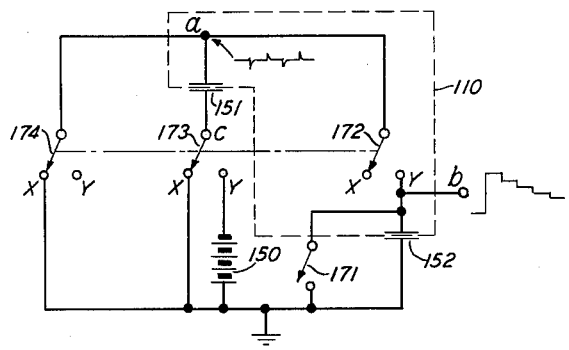
FIG. 1 is a simplified circuit diagram illustrating the control circuit of the invention.

The components of the circuits schematically illustrated are identified by reference numbers so as to identify both the component and the drawing in which it is found. The first digits of the reference numbers refer to the particular figure in which the component is found. The last two digits identify the component within a particular figure. Any components identified by the same last two digits represent corresponding components in different figures. As an example, the capacitor 151 illustrated schematically in FIG. 1 corresponds to capacitor 251 illustrated schematically in FIG. 2. For the purposes of developing mathematical equations, the components in the equations to follow will be identified only by their last two digits.

A well known principle of electrical circuitry is Kirchoff's first law, which states that where two circuit elements are joined at a common node, the algebraic sum of the currents entering that node are at all times equal to zero. When a charged capacitor is electrically connected to an uncharged capacitor, the charge on the charge capacitor flows, as current, to the uncharged capacitor. The total charge is distributed between the capacitors. The redistribution of the charge will vary as the ratio of the capacitances.

Referring now to FIG. 1, two capacitors, 151 and 152, are conductively connected and disconnected by means of a single-pole single-throw switch 172. The switching action of the switch 172 is synchronized with the switching of the single-pole single-throw switches 173 and 174. In switching 172 from position X, as shown, to position Y, the switches 173 and 174 will likewise be switched from position X to Y.

With the switches in position X, the capacitor 151 has both of its plates connected to ground. When the switches are thrown to position Y, a negative voltage supply is applied to the lower plate of capacitor 151. The upper plate of capacitor 151, contiguous to node a, is electrically connected with the adjacent plate of capacitor 152. The switch 171, which shunts the capacitor 152, serves to discharge it to ground.

The control circuit in FIG. 1 operates as follows:

Assume that initially the switches 172, 173, and 174 are in the position X, and that the switch 171 has been closed and then opened. The potential at node a, which is that of the upper plate of capacitor 151, is at ground. The potential of node b, which is that of the upper plate of capacitor 152, is also at ground. The switches 172, 173, and 174 are shifted to position Y. The negative voltage of battery 150 is applied to the lower plate of capacitor 151 at node c.

With switches 172, 173, and 174 in the Y position, the upper plates of capacitors 151 and 152 are conductively isolated from the remainder of the circuit. Any charge that is contained on either plate can only be transferred to the other plate. Consequently, the algebraic sum of the total charge within the isolated circuitry, illustrated by the dashed line 110, must remain a constant. The resultant negative voltage at node b will be determined by the ratio of the capacitances of the two capacitors 151 and 152. The voltage at node b will be a predetermined fraction of the potential at node c and will be below ground.

The switches 172, 173, and 174 are reset to the X position. During the interval as the switches 172, 173, and 174 are being moved from the Y position to the X position, the capacitor 151 remains charged with a negative voltage. The capacitor 152 also retains the previous charge it has assumed. The capacitor 151 discharges to ground when the switch is reset.

The cycle can be repeated with the exception that switch 171 remains permanently open. Each cycle finds the potential at node d decreasing by a negative increment, with the two capacitors 151 and 152 acting as a capacitive voltage divider. The negative incremental decrease of the voltage at node b, during each cycle, is progressively smaller than the incremental decrease of the previous cycle. The voltage level at the node b decreases in a step-like function.

Figure 2:
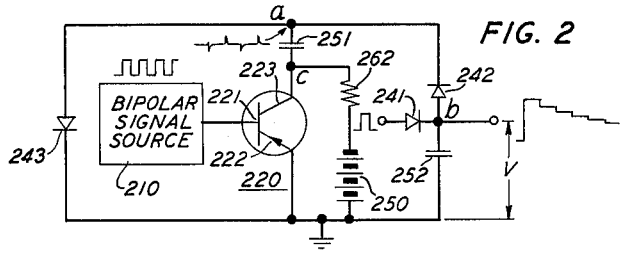
FIG. 2 is a more detailed circuit diagram of the same control circuit, substituting semiconductor devices for the switches in FIG. 1.

Referring now to FIG. 2, a more practical embodiment of a capacitive voltage divider, for the purposes of the invention, is schematically illustrated. Two capacitors 251 and 252 are connected in series with a semiconductor diode 242. This diode serves to enable and disable the electrical connection between the two capacitors. A second semiconductor diode 243 is inserted in series with diode 242 and the grounded plate of capacitor 252.

A transistor 220, comprising a base electrode 221, an emitter electrode 222, and a collector electrode 223, has its base electrode successively energized and de-energized by a bipolar signal source 210. The emitter electrode 222 is connected to ground and to the anode of diode 243. The collector electrode 223 is connected to capacitor 251, to the cathode of diode 243 and to the resistor 262. The resistor 262 is connected to the negative terminal of battery 250 whose positive terminal is grounded.

The collector-emitter path of transistor 220 is connected in series with diode 242 and capacitors 251 and 252. These circuit elements are connected to form a closed loop. The diode 243 is connected in parallel with the collector-emitter path of transistor 220 and capacitor 251. The polarity of this diode is oriented in the same direction as is diode 242.

The absolute voltage output of the bipolar signal source 210 is selected so that the transistor 220 will function as an on-off switch. Since the transistor 220 is of the PNP type, a positive signal, applied to its base electrode, will cut the transistor off. A negative signal, applied to the transistor's base electrode, will turn it on. The potential of the collector electrode will therefore vary as one of two possible conditions; a potential level of ground, and a potential level of −E, determined by battery 250 and resistor 262.

A diode 241 is connected to node b of the closed loop connection. The purpose of this diode is to discharge the adjacent plate of capacitor 252 to ground potential when the diode 241 is forward biased by a triggering pulse.

The circuit above operates as follows:

Assume that a positive pulse has been applied to the cathode of diode 241, and that transistor 220 is turned on. The forward biasing of diode 241, by a positive pulse, discharges the plate of capacitor 252, adjacent to node b, to ground potential. Since the plate of capacitor 252, adjacent to ground, and the plate of capacitor 251, adjacent to collector electrode 223, are at ground potential, no charge is deposited on either of the two capacitors.

A positive pulse, applied to base electrode 221, reverse biases the emitter junction of transistor 220 and turns it off. This causes the collector electrode 223 to drop to a negative potential of −E. Supplied by battery 250 through resistor 262 this negative voltage of −E is applied to the adjacent plate of capacitor 251. The plate of this capacitor, adjacent to node a, immediately changes an equal negative increment of voltage through diode 243. This voltage is applied to the anode of diode 242 and forward biases it. This enables current to flow, which is occasioned by the potential drop from node b to node a. The potential level of node b is thereby lowered a negative increment of voltage. The magnitude of this increment is determined by the ratio of the capacitances of the capacitors 251 and 252.

A subsequent negative pulse, applied to the base electrode 221, forward biases the emitter junction of transistor 220 and turns it on. The potential of the collector electrode rises to ground. This potential is applied to the adjacent plate of capacitor 251. The opposite plate of capacitor 251 attempts to rise an equal positive increment of voltage. This plate, however, is clamped to ground by the diode 243. Since the positive potential at node *a* exceeds the slightly negative potential at node *b*, the diode 242 is reverse biased and node *a* is conductively isolated from node *b*.

The succeeding positive pulse, applied to base electrode 221, turns transistor 220 off. The collector electrode 223 drops to a negative potential of —E as hereinbefore defined. This potential applied to the capacitor 251 forward biases diode 242 and permits the transfer of negative charge from the plate of capacitor 251, adjacent to node *a*, to the plate of capacitor 252, adjacent to node *b*. The potential level of node *b* is thereby lowered by another negative increment.

The rate at which the voltage V, at node *b* decreases during every cycle of operation is determined by the ratio of the capacitances of the capacitors 251 and 252 and the prior charge contained on capacitor 252. Assume at some time $T_1$ that capacitor 252 has a charge of $Q_2$ with a voltage $V_1$ and that capacitor 251 has a charge of $Q_1$. As the diode 242 becomes forward biased, the two capacitors 251 and 252 are conductively connected to each other. The capacitor 251, being more negative than capacitor 252, is found to share a portion of its charge with the capacitor 252. The voltage $V_2$ then existing at node *b* may be expressed as:

$$V_2 = \frac{Q_1 + Q_2}{C_{51} + C_{52}} \quad (1)$$

$$V_2 = \frac{C_{51}E + C_{52}V_1}{C_{51} + C_{52}} \quad (2)$$

The voltage at node *b*, during the previous cycle, is designated as $V_1$. It follows that the voltage $V_3$ at node *b* during the succeeding cycle will be:

$$V_3 = \frac{C_{51}E + C_{52}V_2}{C_{51} + C_{52}} \quad (3)$$

The voltage E, being supplied by the battery 250, is substantially a constant. Inasmuch as the capacitor 252 is clamped to a maximum positive voltage of ground by the diode 243, the voltage applied to node *a* is substantially a constant for each successive cycle.

The voltage V decreases in accordance with a step function, each successive step being smaller than the preceding one. The decrease of voltage is an exponential function which approaches a limiting negative voltage of E.

Figure 3:
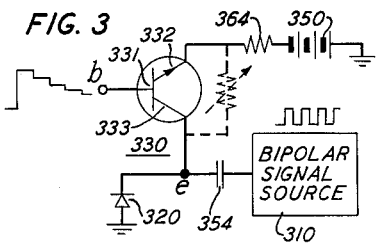
FIG. 3 is a circuit diagram of the discharge path of one of the cross-connected capacitors of an astable multivibrator in accordance with the present invention.

Referring now to FIG. 3, a capacitor discharge circuit is schematically illustrated with a variable impedance discharge path. The variable impedance device indicated consists of a transistor 330, comprising a base electrode 331, an emitter electrode 332, and a collector electrode 333. The function of the transistor 330 is indicated by the schematically illustrated variable resistor shown in dotted line form.

The collector-emitter path of transistor 330 is connected in series with the bipolar signal source 310, capacitor 354, the resistor 364, and the battery supply 350. The base electrode of the transistor 330 is connected to node *b* of the capacitive voltage divider described above. A semiconductor diode 320, whose cathode is grounded, has its anode connected to the collector electrode 333 at node *e*. This diode represents schematically the base-emitter path of transistor 220 in FIG. 2.

Inasmuch as the bipolar signal source 310 also controls the step-like voltage output of the capacitive voltage divider at node *b*, the signal source 310 is synchronized with the step-like voltage at node *b*.

The above circuit operates as follows:

Assume that a negative bipolar pulse is applied to the capacitor 354 for a reasonable length of time. The voltage of the plate of the capacitor 354, adjacent to the bipolar signal source 310, is at a negative potential. The voltage of the plate of the capacitor 354, adjacent to node *e*, is clamped at ground potential by the diode 320.

As the bipolar signal source 310 changes state, a positive pulse is applied to the adjacent plate of capacitor 354. The opposite plate of the capacitor 354 rises an equal positive increment of voltage. The voltage source 350 immediately starts charging this plate negatively through the variable impedance device, i.e., the collector-emitter path of transistor 330. The amount of the charging current is determined by the impedance presented by transistor 330 and resistor 364. This impedance presented is determined by the voltage applied to the base electrode 331.

Since the voltage level V at the node *b* decreases with each cycle of the bipolar signal source 310, the charging current will decrease a proportional amount during each succeeding cycle. Hence, the time necessary to negatively charge the plate of capacitor 354, adjacent to node *e*, will be increased for every cycle.

Taking into account that the base current of transistor 330 and its base-to-emitter voltage drop are for all practical purposes negligible, the charging current may be defined as:

$$I_c = \frac{E - V_1}{R_{64}} \quad (4)$$

The voltage is the voltage of the node *b*, which is determined by the capacitive voltage divider. Inasmuch as the voltage V decreases in every cycle of operation, the charging current decreases during every successive cycle. (The subscript of V designates a particular voltage at a particular time.)

The time necessary to charge capacitor 354 during any particular cycle is $t = Q/I_c$, or $$t_1 = \frac{C_{54}ER_{64}}{(E - V_1)} = \frac{K}{(E - V_1)} \quad (5)$$

During the next cycle of operation, because the plate of capacitor 252, adjacent to node *b*, has been charged more negatively, the voltage on the base electrode 331 has decreased to a value of $V_2$. The charging time required for this cycle is therefore:

$$t_2 = \frac{K}{(E - V_2)} \quad (6)$$

The rate at which the voltage V decreases during every cycle of operation is determined by the ratio of the capacitances of the two capacitors 251 and 252. The ratio of the two charging times $t_1:t_1$ is likewise determined by the ratio of the capacitances of the two capacitors 251 and 252. Expressing the term $E - V_2$ in terms of $V_1$, we obtain from Equation 2:

$$E - V_2 = E - \frac{C_{51}E + C_{52}V_1}{C_{51} + C_{52}} \quad (7)$$

or $$E - V_2 = (E - V_1)\frac{C_{52}}{C_{51} + C_{52}} \quad (8)$$

hence, from Equation 6:

$$t_2 = \frac{K(C_{51} + C_{52})}{C_{52}(E - V_1)} \quad (9)$$

The ratio of the two charging times becomes:

$$r = \frac{t_2}{t_1} = \frac{C_{51} + C_{52}}{C_{52}} = 1 + \frac{C_{51}}{C_{52}} \quad (10)$$

Hence, each successive charging time will be a fixed multiple of the charging time of the preceding cycle.

Figure 4:
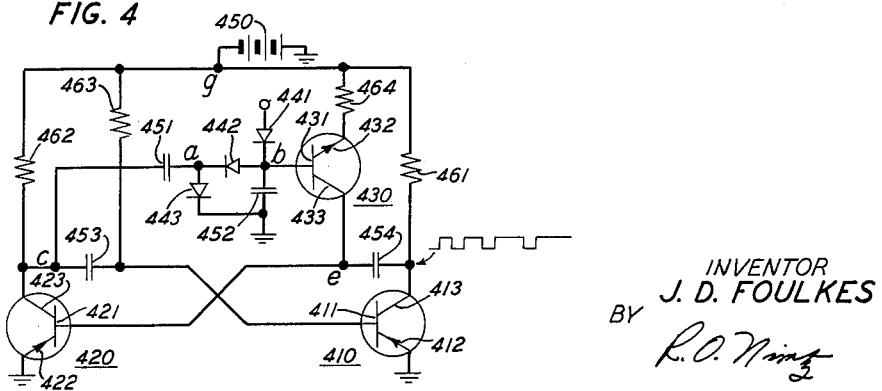
FIG. 4 is a detailed circuit diagram of an astable multivibrator utilizing the principles of the present invention.

Referring now to FIG. 4 of the drawings, the astable multivibrator, schematically illustrated, comprises a transistor 410, having a base electrode 411, an emitter electrode 412, and a collector electrode 413; a transistor 420 of a similar conductivity type having a base electrode 421, an emitter electrode 422, and a collector electrode 423; and a transistor 430 of an opposite conductivity type having a base electrode 431, an emitter electrode 432, and a collector electrode 433. It is to be understood that the conductivity types of the transistors shown in FIG. 4 could be reversed, with a reversal of the bias voltages and the unilateral conducting devices of the circuit.

A negative potential source 450 is connected to node $g$ of the circuit. A resistor 461 connects node $g$ to the collector electrode 413, a resistor 462 connects node $g$ to the collector electrode 423. A resistor 463 connects base electrode 411 to node $g$. A timing capacitor 453 connects the base electrode 411 to the collector electrode 423. Similarly, a timing capacitor 454 connects the base electrode 421 to the collector electrode 413. The emitter electrodes 412 and 422 are both grounded.

A resistor 464 connects the emitter electrode 432 to the negative potential source 450 at node $g$. The collector electrode 433 is connected to the base electrode 421. The base electrode 431 is connected to the capacitor 452, used to control the level of conduction of transistor 430. The capacitor 452 in turn is connected to ground. The cathode of diode 441 and the anode of diode 442 are both connected to the base electrode 431, at node $b$. The cathode of diode 442 is connected to the anode of diode 443, at node $a$. A capacitor 451 connects the node $a$ to the collector electrode 423.

The circuit described above operates in the same manner as any standard astable multivibrator, with the exception that the time intervals of conduction for one of the two amplifying transistors is increased by a fixed multiple during each succeeding cycle.

The circuit operates as follows: As either one of the transistors 410 or 420 switches into a conducting condition, the positive voltage of its collector electrode 413 or 423 will drive the base electrode 421 or 411 of the opposite transistor 420 or 410 positive, and turn that transistor off. The transistor will remain turned off until its adjacent timing capacitor is charged sufficiently negatively to forward bias the emitter junction of the transistor and turn it on.

The charging time of one of the timing capacitors is altered during each succeeding cycle by means of a variable impedance device in the charging path. Such a variable impedance device and its control circuit has been described and schematically illustrated in FIGS. 2 adn 3. The bipolar signal source is the transistor 410 in the illustrative embodiment.

It is noted that transistor 410 will be turned off for a short period, of fixed duration, during every cycle. The timing of its conduction period is variable and is determined by the impedance presented by transistor 430. The impedance level of this transistor is determined by the voltage level at node $b$, which in turn is determined by the voltage on capacitor 452.

Because of the capacitive voltage dividing arrangement of capacitors 451 and 452, every time the transistor 420 changes state to a cut-off condition and returns to a conducting condition, the capacitor 452 is partially discharged. This lowering of the voltage at node $b$ increases the impedance in the charging path for the timing capacitor 454. Hence, the pulse output at the collector electrode 413 is a sequence of pulses whose width increases as time progresses. The successive widths of the pulses correspond to a geometric series.

A practical limit to the maximum pulse width is determined by the reverse saturation current level of the transistor 430. This becomes effective when the duration of time intervals of the charging of capacitor 454 becomes so great that the base current effect on the charge on capacitor 452 can no longer be ignored.

A new timing cycle may be initiated by the application of a pulse of positive voltage to the anode of diode 441, as considered in more detail in connection with diode 241 in FIG. 2. As noted in connection with FIG. 2, this pulse, by forward biasing the diode 441 into a conducting condition, also forward biases diodes 442 and 443 and permits the capacitor 452 to discharge via the conducting path established thereby. This raises the voltage on base electrode 431 to ground potential so that transistor 430 is biased into a low resistance conducting condition. Removal of the pulse electrically disconnects the discharge path and permits the storage of charge on the capacitor 452 and the consequent initiation of a new logarithmic timing cycle.

The embodiment described here is intended to describe the principles of the invention and is not intended in any way to limit its spirit and scope. The circuit could be devised, for instance, to provide a chain of pulses of decreasing width. Various changes in structure and component parts used will be immediately obvious to those skilled in the art as being within the spirit and scope of the invention.

What is claimed is:

1. A pulse generating circuit comprising a first and a second transistor of one conductivity type, a third transistor of the opposite conductivity type, a first coupling capacitor interconnecting the base electrode of said first transistor and the collector electrode of said second transistor, a second coupling capacitor interconnecting the base electrode of said second transistor and the collector electrode of said first transistor, a source of energizing potential, a first timing discharge path including the collector-emitter path of said third transistor interconnecting the base electrode of said second transistor and said source of energizing potential, a second timing discharge path including fixed impedance means interconnecting the base electrode of said first transistor and the collector electrode of said second transistor, a first discharge control capacitor interconnecting the base electrode of said third transistor and ground, a second discharge control capacitor interconnecting the collector electrode of said second transistor and the cathode of a switching diode, the anode of said switching diode being connected to the base electrode of said third transistor, a clamping diode interconnecting a circuit node, common to said second discharge control capacitor and the cathode of said switching diode, and ground, and a discharge diode having its cathode connected to a current node, common to the base electrodes of said third transistor and said first bias capacitor.

2. An astable multivibrator circuit comprising a first and second semiconductor amplifying device of one conductivity type, a third semiconductor amplifying device of an opposite conductivity type, each of said semiconductor amplifying devices including at least an emitter electrode, a base electrode and a collector electrode, a source of reference potential, a source of energizing potential, capacitive means connecting the collector electrode of said first and second semiconductor amplifying devices to the base electrode of said second and first semiconductor amplifying devices, respectively, discharge means for said capacitive means, said discharge means including a variable impedance discharge path, said variable impedance discharge path including the collector-emitter path of said third semiconductor amplifying device, an incremental charge storage circuit, said charge storage circuit comprising a charge transferring capacitor, a charge storage capacitor, directional switching means, and a clamping diode, one terminal of said directional switching means and the anode of said clamping diode being connected to one terminal of said charge transferring capacitor, the other terminal of said charge transferring capacitor being connected to the collector electrodes of said second semiconductor amplifying device, the polarity of said directional switching means oriented to charge said charge storage capacitor, the terminal of said charge storage capacitor connected to said directional switching means being connected to the base electrode of said third semiconductor amplifying device, the other terminal of said charge storage capacitor being connected to said reference source, the cathode of said clamping diode being connected to said reference source, and means to discharge said charge storage capacitor.

References Cited by the Examiner

UNITED STATES PATENTS

| | | | |
|---|---|---|---|
| 2,752,511 | 6/1956 | Beaufoy | 331—144 |
| 2,757,282 | 7/1956 | Exner | 331—144 |
| 2,848,610 | 8/1958 | Freienmuth | 331—145 |
| 3,008,088 | 11/1961 | Beeler | 328—200 |

ROY LAKE, *Primary Examiner.*

JOHN KOMINSKI, *Examiner.*